No. 863,109. PATENTED AUG. 13, 1907.
F. G. SIMPSON & W. M. PRICE.
INDICATOR FOR ELECTRICAL MEASURING INSTRUMENTS.
APPLICATION FILED APR. 29, 1904.
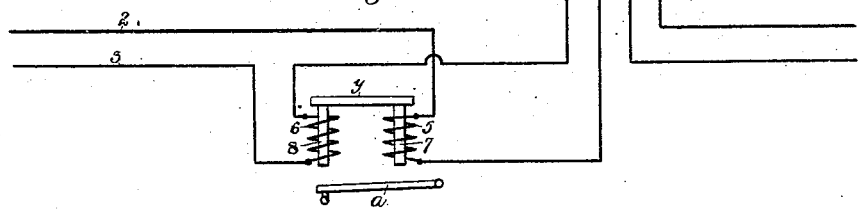
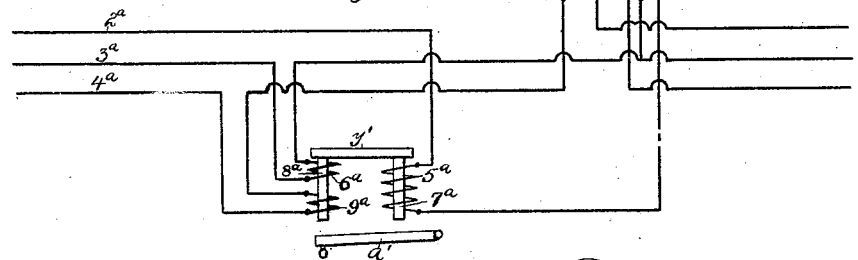
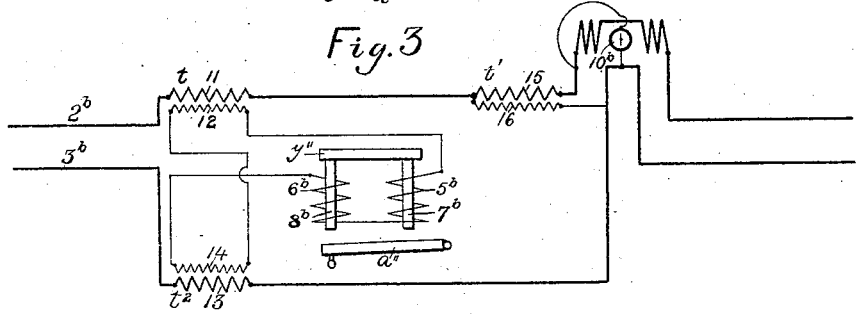
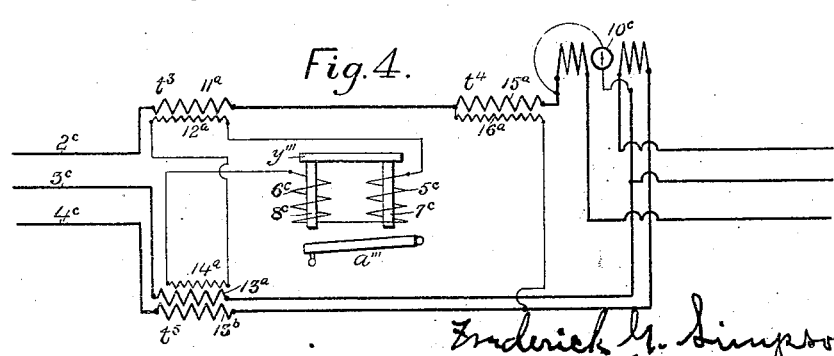

UNITED STATES PATENT OFFICE.

FREDERICK GRANT SIMPSON AND WILLIAM MOUTELIUS PRICE, OF SEATTLE, WASHINGTON.

INDICATOR FOR ELECTRICAL MEASURING INSTRUMENTS.

No. 863,109.  Specification of Letters Patent.  Patented Aug. 13, 1907.

Application filed April 29, 1904. Serial No. 205,506.

*To all whom it may concern:*

Be it known that we, FREDERICK GRANT SIMPSON and WILLIAM MOUTELIUS PRICE, citizens of the United States, both residing at Seattle, in the county of King and State of Washington, have invented a new and useful Indicator for Electrical Measuring Instruments, of which the following is a specification.

Our invention relates to indicators which may be installed with or attached to instruments for measuring direct, pulsating or alternating currents, and its purpose is to prevent tapping of the circuits by maliciously-disposed persons, to detect defective installation or wiring, or other diversion from such measuring instruments of the currents designed to pass through them.

The invention comprehends more particularly an armature controlled by a magnetically-balanced electro-magnet whose exciting current is developed in various ways, depending upon the nature of the current being measured and of the connections of the instrument.

In the accompanying diagrammatic drawings, Figure 1 illustrates our invention as applied to a two-wire, continuous-current system; Fig. 2, shows its application to an Edison three-wire or convertible two- to three-wire, continuous-current system; Fig. 3, shows its application to a two-wire system for either pulsating or alternating currents and Fig. 4, shows its application to an Edison three-wire, or convertible two- to three-wire, system for pulsating or alternating currents.

Similar reference character indicate like parts, in each of the figures.

In Fig. 1, the wires 2, 3, represent a portion of the mains before they enter the measuring instrument. The main 2 is carried in a coil 5 around one core 7 of an electro-magnet and passes thence to the measuring instrument, to which it is connected in any manner necessitated by the type of instrument used, and thence to line. The wire 3 forms a coil 6 around the other core 8 of the magnet, the direction of the coil-winding being such that the polarity of the magnetism induced in the core 8 is opposed to that of the core 7; these cores being magnetically connected by a yoke $y$. The result of this manner of winding is that the armature $a$ is not attracted by the cores 7, 8, until the magnetic balance is destroyed by some disturbance in the circuit. This disturbing element may be a conductor connecting any two points of either of the mains 2, 3, on opposite sides of the measuring instrument 10, so as to form a shunt around it, or it may be leakage due to defective installation or damaged insulation. The effect of any such connection or defect is to vary the magnetism of the core embraced by the coil so shunted or included in the defective portion of the circuit, destroy the original magnetic balance and attract the armature $a$; thus actuating any indicating device controlled by the armature.

In Fig. 2, the wires $2^a$, $3^a$, $4^a$, represent, as before, portions of the mains before they enter the measuring instrument. Wire $2^a$ is carried in a coil $5^a$ around core $7^a$ thence to the measuring instrument and thence to line. Wire $3^a$ is carried in a coil $6^a$ around core $8^a$, thence to the measuring instrument and thence to line. Wire $4^a$ is carried around the same core in a coil $9^a$, and thence to the measuring instrument and thence to line.

In cases where the wire $3^a$ is the neutral main, the current therein is at all times equal to the difference of the currents then flowing in the mains $2^a$ and $4^a$, and is always flowing in the direction of the lesser current flowing at that instant in either of the other mains. This current in the neutral main, flowing through coil $6^a$, induces a polarity in the core $8^a$ which, together with that induced by the coil which is at that instant carrying the lesser current in the outside main, balances the effect of the polarity induced by the flow in the coil carrying the larger current; and the armature, as before, remains at rest. But this magnetic balance may be destroyed by any of the line disturbances described in connection with Fig. 1.

In cases where the main $3^a$ carries the sum of the currents of the mains $2^a$ and $4^a$, the current in the coil $6^a$ is at any instant equal and opposite to the sum of the currents in the coils $5^a$ and $9^a$, and the magnetic balance of the cores and yoke is still maintained.

In Fig. 3, the wires $2^b$ and $3^b$ represent those portions of mains carrying pulsating or alternating currents, before said mains enter the measuring instrument. In this case, the main $2^b$ is carried through the primary 11 of a transformer $t$, thence through the primary 15 of the transformer $t'$, and thence as above described. The main $3^b$ is carried through the primary 13 of a transformer $t^2$, thence connected to the measuring instrument in any desired manner, and thence carried to line. The secondaries 12 and 14 of the transformers $t$ and $t^2$ are so connected through their respective coils $5^b$ and $6^b$ that the currents in these coils are equal and opposite to each other, thus establishing a magnetic balance in the cores $7^b$ and $8^b$. Again, any of the line disturbances above described will destroy this balance and actuate the armature $a''$.

In Fig. 4, is represented the mode of wiring the indicator in a three-wire, or convertible two- to three-wire system carrying pulsating or alternating currents. The wires $2^c$, $3^c$ and $4^c$ represent the mains, as described above in connection with Fig. 2. In this case, the wire $2^c$ is carried through the primary $11^a$ of the transformer $t^3$, thence through the primary $15^a$ of the transformer $t^4$, thence connected to the measuring instrument, as desired, and thence carried to line. Wire $3^c$ is carried through one of the primary coils $13^a$ of the transformer $t^5$, thence connected to the measuring instrument, as desired, and thence carried to line. Wire $4^c$ is carried through the other coil $13^b$ of the transformer $t^5$, thence to the measuring instrument and thence to line.

In the transformers $t'$ and $t^4$, Figs. 3 and 4, the coils 16, $16^a$ are composed of fine wire, so wound as to produce a high impedance, and connected to the mains $2^b$, $3^b$ and $2^c$, $4^c$ respectively. The current flowing in these coils, due to the impressed electro-motive force, will induce a counter electro-motive force in the coils 15, $15^a$. The coils 15, $15^a$ are of course wire and become short-circuited secondaries to the coils 16, $16^a$, when a shunt is connected to either $2^b$ or $2^c$, in the manner described with reference to Fig. 1, thereby permitting a current of maximum intensity to flow through 15 or $15^a$ and through the shunt, in a direction opposite to that induced by the impressed electro-motive force, thereby inducing currents in the secondaries 12 or $12^a$ in the same direction as that flowing at the same instant in the secondaries 13 or $13^a$, and destroying the magnetic balance in the armature-controlling cores.

Our object in inserting the transformers $t'$, $t^4$ in the systems shown in Figs. 3 and 4, is to provide an additional means of destroying the magnetic balance in the indicator cores, and to guard against the bridging of the primary circuits in both the transformers, as $t$, $t^2$, at the same instant.

In cases where the main $3^c$ carries the sum of the currents flowing in the mains $2^c$, $4^c$, the current flow through the primary $13^a$ of the transformer $t^5$ is equal and opposite to the current flow in the primary $13^b$ of transformer $t^5$ plus the current flow in primary $11^a$ of transformer $t^3$, thereby inducing a current in the secondary $14^a$ of the transformer $t^5$ equal to that induced in the secondary $12^a$ of transformer $t^3$.

As installed, the indicator mechanism is either entirely within the casing of the meter in connection with which it is used, or the connections between the indicator and meter so protected that it is impossible to make an electrical connection with the conductors between the indicator and the meter or between any of the parts of the indicator itself.

The operation is as follows: Any attempted shunt in any of the branches 2, 3, $2^a$, $3^a$ or $4^a$ will, by varying the resistance of that branch, overthrow the magnetic balance of the device and operate the indicator. In the modification of Fig. 3, for example, not only would it be practically impossible to simultaneously cut out both branches of the main circuit around the indicator and meter by shunts of such low resistance as to render the transformers inert; but, if it were accomplished, there would be set up a current in the secondary 16 of transformer $t'$ which would induce a current in coils 15, 11 and 12, sufficient to actuate the indicator. If primary 13 of transformer $t^2$ were at that instant absolutely inert, its secondary 14 would furnish no current to oppose that of the coil 12; as during the normal action of the transformers. If, on the other hand, a slight current should, at that instant, be flowing through 13, it would induce in 14 a current which would reinforce that of secondary 12, instead of opposing it, and the indicator would still be actuated. The operation of the modification of Fig. 4 is similar to that just explained.

In systems carrying alternating currents the magnet cores may be laminated, if desired, to prevent heating.

The skilled electrician will be able to modify in various ways the circuits above-described, without departing from the spirit of our invention; since

What we claim is:

1. The combination of a normally closed electrical circuit, a measuring instrument having members connected in series and in shunt in said circuit, a series-wound, magnetically-actuated indicator having a signal-operating armature and operatively connected with said circuit, and magnetizing means for said indicator, said means being so constructed and arranged as to release said indicator-armature when said measuring instrument is receiving its normal current; substantially as described.

2. In an indicating device for electrical measuring instruments, a primary circuit containing a measuring instrument and a plurality of transformers having their secondaries connected each to balance the others, an electro-magnet having its winding interposed in said secondary circuit and an indicating armature adapted to be actuated by the unbalancing of the currents flowing in the respective leads of the primary circuit; substantially as described.

3. In an indicating device for electrical measuring instruments, a primary circuit comprising the measuring instrument and a plurality of transformer-primaries, said transformers having their secondaries connected each to balance the others under normal current-conditions in the primaries, an electro-magnet having its winding interposed in said secondary circuit, and an indicating armature adapted to be actuated by the core of said electro-magnet when the current conditions in the respective leads of said primary circuit become abnormal; substantially as described.

4. In an indicator for electrical measuring instruments, a main circuit, a transformer in each branch of said circuit, said transformers having their secondaries connected each to balance the effect of the others, an electro-magnet having its coils in said secondary circuit, and an auxiliary transformer having its primary in one branch of the main circuit and its secondary connected to a plurality of branches of the main circuit; substantially as described.

FREDERICK GRANT SIMPSON.
WILLIAM MOUTELIUS PRICE.

Witnesses:
H. B. HOYT,
HIRAM C. GILL.